United States Patent [19]

Lerner

[11] 3,895,926
[45] July 22, 1975

[54] METHOD FOR TREATING A GAS

[76] Inventor: Bernard J. Lerner, 727 Orchard Hill Dr., Pittsburgh, Pa. 15238

[22] Filed: Apr. 9, 1974

[21] Appl. No.: 459,290

Related U.S. Application Data

[63] Continuation-in-part of Ser. No. 356,572, May 2, 1973, abandoned.

[52] U.S. Cl. .................. 55/84; 55/260; 55/462; 261/79 A; 261/126
[51] Int. Cl.² ................. B01D 47/06; B05B 7/10
[58] Field of Search ............. 55/260, 223, 244, 235, 55/248, 239, 250, 251, 257, 258, 259, 84, 85, 462; 261/126, 115, 79 A

[56] References Cited
UNITED STATES PATENTS

| | | | |
|---|---|---|---|
| 1,941,545 | 1/1934 | Eichenberg et al. | 261/115 X |
| 2,354,674 | 8/1944 | Fisher | 55/257 |
| 2,387,345 | 10/1945 | Pearl | 55/260 X |
| 2,643,105 | 6/1953 | Lipowitz | 261/126 X |
| 3,045,990 | 7/1962 | Kennan, Jr. | 261/126 X |
| 3,605,386 | 9/1971 | Erwin et al. | 261/126 X |

FOREIGN PATENTS OR APPLICATIONS

| | | | |
|---|---|---|---|
| 575,293 | 4/1958 | Italy | 261/126 |
| 538,619 | 11/1931 | Germany | 55/260 |
| 16,646 | 5/1903 | United Kingdom | 55/260 |

*Primary Examiner*—Frank W. Lutter
*Assistant Examiner*—Neil F. Greenblum
*Attorney, Agent, or Firm*—Hymen Diamond

[57] ABSTRACT

A vessel has an open top portion and a bottom wall. An inlet conduit extends axially through the bottom wall into the vessel and has an upper end portion terminating above the bottom wall to form an annular area between the inlet conduit and the vessel wall. A baffle plate is positioned above the upper end portion of the inlet conduit in spaced relation thereto with a clearance gap therebetween. The baffle has transverse dimensions less than the transverse dimensions of the vessel to form a peripheral gap between the baffle and the vessel wall. Spray nozzles are positioned above the baffle plate and below the baffle plate. A mist eliminator is positioned in the open top portion of the vessel to remove the liquid from the gas leaving the vessel. Untreated or dirty gas is introduced into the vessel through the inlet conduit at a preselected velocity. The untreated gas is impinged on the underside of the baffle plate and is deflected transversely through the clearance gap and a portion of the untreated gas flows upwardly through the peripheral gap and forms a primary vortex above the baffle plate. A second portion of the untreated gas is deflected downwardly and forms a secondary vortex in the annular area between the inlet conduit and the vessel wall. Liquid in droplet form is introduced into both the primary and secondary vortices without disrupting the stability of the vortices. A portion of the liquid in droplet form is circulated with the untreated gas in the primary and secondary vortices to treat the gas. The treated gas is withdrawn from the vessel through the open upper end portion and the liquid is collected in a reservoir adjacent the vessel bottom wall.

10 Claims, 2 Drawing Figures

PATENTED JUL 22 1975 3,895,926

METHOD FOR TREATING A GAS

CROSS-REFERENCE TO RELATED APPLICATIONS

This application is a continuation-in-part of application, Ser. No. 356,572, filed on May 2, 1973, now abandoned and entitled "Method And Apparatus For Treating A Gas".

BACKGROUND OF THE INVENTION

1. Field of the Invention

This invention relates to a method for treating a gas and more particularly to a method for obtaining a unique state of high intensity gas liquid spray contact.

2. Description of the Prior Art

Liquid spray gas contacting devices, in which the gas as a continuous fluid phase is contacted with a dispersed liquid phase or spray formed by a nozzle (preformed), have long been used for gas washing for dust removal or absorption in situations where low gas pressure drop or energy loss is required. However, a concommitant feature of pre-formed spray, low energy loss gas scrubbers is their relatively poor contacting efficiency relative to other liquid gas contacting devices such as packed towers. The deficiencies of spray contactors result from the short contact time of the liquid droplets with the gas stream. The liquid spray residence or dwell time in the flowing gas is limited to the short "time of flight" between release from the spray nozzles and interception by the vessel wall surfaces. Increases in vessel size to compensate for this short contact time deficiency of the spray contactor result in uneconomic vessel costs without significant efficiency improvement. For example, P. Kalika, "Chemical Engineering", 76, No. 16, pages 133–138, July 28, 1969, reports an evaporation efficiency of only 60% for a large commercial spray contactor for cooling hot incineration off-gases.

Various methods for improving spray/gas contacting have been proposed or commercially used, with either no notable success or with the introduction of high energy losses. Centrifugal or cyclone spray contactors wherein the gas is introduced tangentially in a cylindrical vessel and in which the spray is introduced axially, as in the Pease-Anthony scrubber, serve to increase contact time by securing a curved path for liquid droplet travel, thus increasing residence time of the dispersed liquid in the gas. However, because of the necessarily high centrifugal gas action in such cyclone contactors, the centrifugal forces imposed on the drops serves to shorten drop residence times theoretically obtainable if the drops traveled with the gas at gas velocities. Consequently, such centrifugal gas/liquid contacting devices suffer from low average spatial concentrations of liquid droplets, with the only region of high drop concentration being that near the spray injection nozzle, a characteristic of all conventional spray systems. The spatial concentration of droplets in a spray scrubber is a highly critical property for dust removal applications, because efficient removal of the finer dust particles below 50–100 microns, requires opportunity for dust/particle collisions, which, in turn, is a function of both dust particle spatial volumetric concentration and similarly sized droplet volumetric concentration. Obviously, a high spatial concentration of smaller drops is also desirable for heat and mass transfer applications because of the increased active interphase contact area. This type of desirable high concentration small droplet dispersion has hitherto been obtainable only in high energy loss gas atomization devices such as Venturi Scrubbers, wherein gas turbulence and impact is used to atomize liquid spray by conducting the gas at very high velocities through a converging nozzle or Venturi Throat and introducing liquid into it at the throat region. Despite the expenditure of much development effort, the Venturi type of scrubber remains an example of the uncontrolled and wasteful use of turbulent energy flow to secure efficient gas/liquid or dust/liquid contacting, with commercial unit gas energy losses varying from 30 to 60 inches water column (W.C.).

Prior art devices involving attempts at achieving optimum spray/gas contact at low energy levels include U.S. Pat. Nos. 3,527,026 and 3,594,980.

SUMMARY OF THE INVENTION

In accordance with the present invention a method is provided for treating a gas that includes introducing an untreated gas into a vessel and forming at least one toroidal vortex of the untreated gas in the vessel. A liquid in preformed droplet form is introduced into the vortex and the gas is treated by the liquid within the vortex. Thereafter, the gas is separated from the liquid and withdrawn from the vessel.

Further, in accordance with the present invention, apparatus is provided for treating a gas which includes a vessel having an open top portion and a bottom wall with a gas inlet opening therein. A baffle plate is positioned within the vessel above the inlet opening in spaced relation to the inlet opening to form a clearance gap therebetween. The baffle plate has a dimension less than the internal dimensions of the vessel and a peripheral gap is formed between the baffle plate and the vessel wall. Spray nozzles are positioned above the baffle plate and arranged to introduce liquid in droplet form into a vortex of gas formed above the baffle plate.

With the present invention spray is injected and trapped in one or more induced gas circulation zones or vortices formed by placing baffles in the path of an accelerated, confined gas stream. When a baffle occupying from one-quarter to approximately half of the gas flow area is placed normal to the gas flow stream in the confining vessel and the gas stream is accelerated by throttling it through a restricted flow area less than the baffle area prior to impingement on the baffle, then a primary stable vortex is created downstream behind the baffle where the gas velocity exceeds a minimum gas velocity. In the preferred embodiment the diameter of the baffle is about one-half the diameter of the vessel so that the area occupied by the baffle is approximately one-fourth of the total gas flow area. The restricted gas flow area of the gas inlet conduit is, however, less than the baffle area and preferably less than 90% of the baffle area. If liquid spray of sufficiently small mean droplet size as for example a preformed spray is injected into the vortex at a critical minimum rate, then a trapped spray zone of extremely high liquid holdup and high gas liquid contacting efficiency is created. The critical minimum liquid spray injection rate is such that it introduces into the vortex a number of trappable droplet sizes equal to those being continuously removed by agglomeration, centrifugal motion and collision with the baffle surfaces. Below this critical minimum liquid spray injection rate, liquid holdup is nominal and contact efficiency poor, while above this minimum, holdup abruptly rises to the 25–50% liquid volume level and contacting becomes intense.

If the throttling throat impinging the gas stream on the baffle is such as to form an annular section between the outside of the throat and containing vessel, a secondary or reflected ring vortex is formed in this section upstream of the baffle, and if liquid spray is injected into this region, then a secondary trapped spray zone of similar properties may be created.

The method and apparatus is suitable in gas washing, for dust removal, gas absorption and general mass transfer operations and the like. The controlled entrapment and retention of small liquid droplets in one or more induced closed gas circulation zones or vortices results in regions of extremely high dynamic liquid holdup and consequent uniquely efficient liquid gas contacting at low gas energy loss levels. The high dynamic liquid holdup is controlled by the rate of liquid spray injection into the zones and the size of the liquid droplets injected into the vortices.

It is the principal object of this invention to provide a method and apparatus to obtain very high gas liquid contact efficiencies at low gas pressure drop by utilizing high spatial concentrations of the dispersed liquid droplets trapped in one or more transversely circulating gas vortices.

Another object of this invention is to provide a method and apparatus to obtain an optimum contact with the controlled and minimum use of gas and liquid flow energy with the gas flow energy comsumption corresponding to gas flow pressure losses of less than 10 inches water column.

These and other objects and advantages of this invention will be more completely disclosed and described in the following specification, the accompanying drawings and the appended claims.

DESCRIPTION OF THE PREFERRED EMBODIMENT

Figure 1:
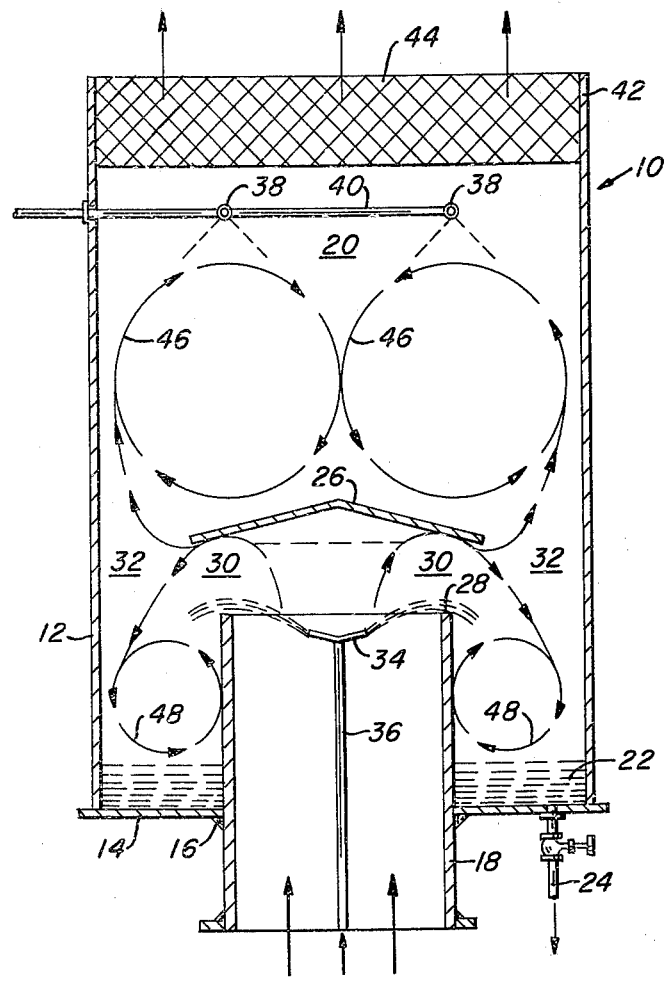
FIG. 1 is a view in section and in elevation, illustrating the improved gas cleaning apparatus.

Referring to the drawings, the gas treating or cleaning apparatus is generally designated by the numeral 10 and includes a cylindrical vessel 12 having a bottom wall 14 with an axial opening 16 therein. A cylindrical gas entry duct 18 extends through the opening 16 upwardly into the internal portion 20 of the vessel 12. The entry duct 18 has a flow area that is less than half the flow area of the main vessel 12. Alternatively, the gas entry duct could have a configuration of a converging section tapering from the cross-sectional flow area of the main vessel 12 to a flow area of less than approximately one-half the area of the main vessel 12. The annular area formed between the cylindrical wall of vessel 12 and the entry duct 18 may be utilized as a reservoir 22 for the drainage liquor prior to removal of the drainage liquor through the outlet conduit 24.

A baffle plate 26, preferably of a conical configuration, is positioned above the outlet end portion 28 of gas entry conduit 18 within the vessel 12. The baffle plate 26 is spaced a preselected distance above the inlet duct outlet end 28 to form a clearance gap 30 therebetween to deflect the gas flowing upwardly through the inlet duct 18 into the internal portion 20 of vessel 12. The baffle plate 26 is positioned axially within the vessel 12 and has a transverse dimension less than the diameter of the cylindrical vessel 12 but greater than the gas outlet end portion 28 and forms a peripheral and symmetrical gap 32 between the conical baffle 26 and the wall of vessel 12.

A spray nozzle 34 is positioned slightly below the upper end 28 of inlet duct 18 and is suitably connected by means of a conduit 36 to a source of spray liquid such as water or the like. The spray nozzle 34 is preferably a nozzle that ejects a preformed spray in a configuration having an angle of about 180°. Second spray nozzles 38 are positioned within the vessel 12 at a location of at least one vortex and preferably two or more vortices about the baffle plate 26 and are connected by means of conduit 40 to preferably the same source of liquid. THe upper open end 42 of vessel 12 has a mist eliminator pad 44 therein to capture wetted and agglomerated particulate matter before the wetted particulate matter leaves the vessel 12. In lieu of the mist eliminator pad 44 a mist eliminator bed comprised of packing of the type disclosed in U.S. Pat. No. 3,410,057 may be positioned in the vessel 12 and provided with spray nozzles to keep the mist eliminator bed rinsed free of accumulated matter. Alternatively, other types of mist eliminators may also be employed.

The dirty or untreated gas enters the vessel 12 through the entry duct 18, as illustrated by the arrows in the drawings and is wetted by the preformed spray from nozzle 34. The dirty gas impinges on the underside of baffle 26 and then flows laterally through the clearance gap 30 between the upper end portion 28 of inlet duct 18 and the underside of baffle 26. A portion of the dirty, untreated gas then flows upwardly through the peripheral gap 32 between the peripheral edge of the baffle 26 and the wall of vessel 12. When the gas velocities through the gas entry duct exit outlet opening 28, clearance gap 30 and peripheral gap 32 are in the range of 250 feet per minute to 2,000 feet per minute and preferably in the range of 500 to 1,500 feet per minute two sets of stable gas vortices are formed. A primary vortex 46 is formed downstream and behind the baffle plate 26 and a secondary vortex 48 is formed at a location below the outlet end 28 of entry duct 18. The secondary vortex surrounds the outer wall of entry duct 18. Both the primary vortex 46 and the secondary vortex 48 are toroidal vortices and in the range of the gas velocities specified are stable or standing vortices rotating in opposite directions as illustrated in the drawings. The gas continually enters and leaves the primary vortex 46 and the secondary vortex 48 and flows upwardly through the vessel 12 and through the mist eliminator pad 44 and is exhausted to the atmosphere.

To secure the novel dispersed liquid vortex entrapment and retention, it is necessary to inject spray liquid into the vortices 46 and 48 through the spray nozzles 34 and 38. THe spray is preferably injected into the vortices either transverse to or co-current with the direction of gas flow at that point of injection so as not to disrupt the stability of the vortex. The droplets of liquid that are small enough to lack sufficient momentum (or escape velocities) to leave the vortex are trapped in the vortex and circulate along with the gas in the closed loop toroidal circulation pattern. However, because the gas flow within the vortex is turbulent and because there are a range of droplet sizes and hence slip velocities, droplet collision and coalescence mechanisms are continuously operative to cause droplet growth to sizes having sufficient momentum to escape the gas vortex.

Because of this continuous droplet escape from the vortex, the high spatial liquid holdup and concentration of this invention is not achieved unless the rate of droplet injection into the vortex equals or exceeds the escape rate. The point at which the rate of droplet spray injection equals the escape rate is termed the critical minimum liquid rate or nozzle pressure and this critical spray rate will be a function of the gas velocity in the vortex, the gas density, the diameter of the vortex, and the size distribution of the droplets injected by the preformed spray from spray nozzles 34 and 38 which, in turn, is a function of the liquid pressure at the nozzle used. Higher spray nozzle pressures are generally advantageous because they result in smaller droplet sizes which are more susceptible to entrapment in the gas vortices and, for a given spray nozzle, higher nozzle pressures yield higher liquid spray rates so that the critical minimum rate also corresponds to a critical nozzle pressure. Because of the variation in spray nozzle types and sizes and the fact that more than one spray nozzle may be advantageously used for spray injection, it is not possible to state a general range of critical minimum liquid spray rate or nozzle pressure and it is necessary to determine the spray rate and nozzle pressures required by preliminary testing in a laboratory or pilot unit. It is advantageous to conduct such tests in transparent equipment or equipment having a sight port for visual inspections because the visual appearance of the primary vortex undergoes an abrupt transition when the critical minimum liquid spray rate and/or pressure is reached, becoming dense and opaque because of the accumulation of the trapped liquid droplets. Observation of the primary vortex in the high liquid holdup zone of operation shows that the standing vortex slowly precesses in a clockwise direction, when viewed from above, releasing streams of coalesced large drops at the region where the standing vortex lifts slightly off the baffle.

It has been determined that an annular vena contracta is formed downstream of the baffle 26 and it is preferable not to inject the spray liquid into this annular vena contracta for optimal liquid retention. A spray directed toward the general area of this low pressure vena contracta is directed into this high velocity wall region and then directed upwardly along or onto the walls. If the wall extends upward beyond the baffle at least one or preferably two vortex diameters a portion of this aspired liquid recycles in the vortex trail. However, this recycle consists primarily of relatively large droplets formed by agglomeration in the vena contracta upon initial aspiration of the fine spray in this zone. As previously stated, liquid in the form of fine droplets is preferred in the vortex holdup pattern and cannot occur when the spray injection is into the vena contracta zone. It has been found when the spray is injected into a region other than the vena contracta preferably from one to two vortex diameters above the baffle a high density liquid holdup in the vortex zone is obtained. Where the spray is injected into the vortex at a location far enough away from the baffle to avoid aspiration of most of the spary into the vena contracta of the annular Venturi throat formed upstream of the baffle, it is believed the only way that liquid can leave the circulating loop is to run down the baffle wall. Liquid running down the baffle wall tends to get picked up and re-entrained as spray in the vena contracta section adjacent the wall. Liquid holdup as recirculating loop spray increases until it reaches equilibrium between spray input and liquid escaping the vena contracta down the wall. Where the spray nozzles 38 are spaced two or more diameters of the primary vortex above the baffle plate 26, two or more vortices are formed in overlying relation and increase the efficiency of the gas cleaning apparatus.

Once the desired high density liquid holdup zones have been created in the standing gas vortices, the dirty gas entering through the inlet duct 18 is deflected by the baffle 26 and a portion of the dirty gas enters the reflected or secondary vortex 48 while the major portion flows through the peripheral gap 32 and enters the primary vortex 46. If the dirty gas contains particulates, the smaller particulate sizes having insufficient momentum to escape from the vortex flow in either the primary or reflected vortices 46 and 48, respectively, and are trapped by the closed circulation vortex flow. Thus, the dirty gas preferentially deposits its smaller size particulate contaminants in the vortices while the larger sized particulates are thrown out to the wall of vessel 12 or the surface of the baffle 26 by the tortuous path of the gas flow around the baffle and the action of the spinning vortices. In the vortices the smaller particulates which lack the momentum to escape and which also constitute the normally difficultly removable fraction for conventional spray scrubbers are trapped in a long residence time zone and exposed to a high concentration density of similarly trapped liquid droplets causing them to collide with the liquid droplets. The liquid droplets containing the wetted particulates collide with other liquid droplets undergoing agglomeration and growth in size until sufficient momentum is achieved for the larger drops to leave the circulation loop of the vortex and spin out to the vessel walls where the liquid and wetted particulate matter drains down into the reservoir 22 and is withdrawn from the vessel 12 through drain pipe 24.

In cases of gas absorption or heat transfer, particularly where long liquid residence times are required to achieve close approach to either mass transfer or heat transfer equilibria, the retention of the trapped liquid spray in the vortices yields high-efficiency contact. A significant contributing factor to high transfer efficiencies, particularly in cases where the major resistance to transfer lies in the liquid phase, is the dynamic droplet collision and growth processes occurring in the high holdup vortex zones once the critical liquid minimum rate or pressure is exceeded. Because external stagnant liquid films develop on small drops and because such films tend to go to equilibrium saturation with a soluble component of a gas stream or with external temperature, it is well known that most of the heat or mass transfer in a conventional spray scrubber takes place in the region of the spray nozzle where fresh external surface is generated, as shown by Pigford and Pyle, "Industrial and Engineering Chemistry", Vol. 43, pages 1649–1662, (1951). To improve mass or heat transfer, it is necessary that this saturated external liquid film on the liquid drop be mixed with the internal unsaturated core of the liquid drop. In the present invention, this is accomplished by the high intensity collision mechanism occuring in the vortex zones of flow, thus continually generating fresh, mixed, unsaturated or nonequilibrium droplet surface, thus yielding unusually high heat and mass transfer rates.

Due to the collision process, the trapped spray zone of the vortices is self-equilibrating. If too high a droplet injection rate is imposed for the existing equilibrium rate of removal, then the concentration of droplets per unit vortex volume increases and the rate of droplet collision, which is dependent on the volumetric concentration of droplets, also increases, yielding a greater number of drops larger than the escape size, and a new drop concentration equilibrium level is achieved. Such higher dynamic equilibrium droplet input and escape levels may be advantageous for certain heat or mass transfer applications, depending to the extent that such processes are rate controlled in conventional spray contactors by the transfer resistance of the stagnant external film on the liquid droplets. The present invention allows operation under conditions where the external drop film resistance can be minimized purely by variation in the liquid spray input rate in combination with the appropriate design for achieving stable gas flow vortices.

Figure 2:
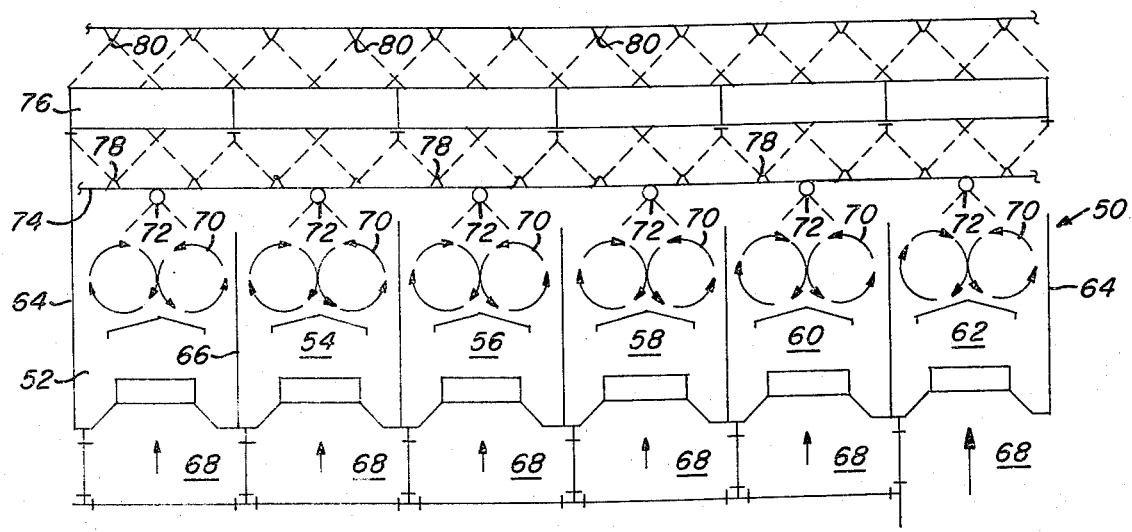
FIG. 2 is a schematic view in elevation and in section, illustrating an array of separate compartmented multiple baffles that may be utilized as single or multistaging contact units.

The versatility of the above described gas treating apparatus is illustrated in FIG. 2 where a plurality of the previously described gas cleaning devices are positioned in what can be termed a tray design with a plurality of units formed in a suitable manner to enclose the entire tray. Where desired, the units and/or trays may be positioned in overlying relation with each other to provide multi-staging. The previously described gas cleaning apparatus is of cylindrical configuration. It should be understood that the gas cleaning units may have any other suitable configuration as, for example, a rectangular configuration.

Referring to FIG. 2, the vessel generally designated by the numeral 50 has a plurality of gas cleaning units 52, 54, 56, 58, 60 and 62. The vessel 50 has an outer wall 64 that forms one of the walls for the units 52 and 62. A common wall 66 separates the units 52 and 54. Further, if there are a series of units behind the unit 52 a common back wall would serve for adjacent units. The gas to be cleaned is supplied through conduits 68 to all of the units 52–62 and the gas to be cleaned is introduced into the respective units 52–62 and subjected to a cleaning action as previously described. Vortices 70 are formed in the units 52–62 and spray nozzles 72 supply liquid in fine droplet form as previously described to the vortices 70. A common header 74 supplies liquid for the respective spray nozzles 72. Positioned above the units 52–62 is a mist eliminator 76 similar to the mist eliminator 44 previously described. Spray nozzles 78 and 80 are provided to continuously wash and clean the mist eliminator 76. It will be apparent from the above that the previously described gas cleaning apparatus may be utilized in a number of gas cleaning operations.

Numerous modifications within the scope of the present invention will occur to those skilled in the art. For example, it may be preferable in some cases to achieve longer gas contact times or more efficiency by multi-staging contact units of the present invention and it is obvious that the contact unit of the present invention lends itself readily to multi-staging in series, whether vertically within one vessel, or within several separate vessels. Additionally, rectangular vessels may be employed, utilizing one baffle, or an array of separate compartmented multiple baffles, to handle a range of gas flows. Other variations and modifications will also readily occur to those skilled in the art. The ranges of the gas velocities previously mentioned constitute preferred embodiments of present invention when applied to gases such as air or steam and the present invention may be practiced outside of these ranges in suitable instances.

An example of industrial application of the present invention will now be described.

EXAMPLE

A commercial food processing plant was intermittently emitting vinegar fumes and spice odors from four 750 gallon kettles in which condiments were prepared. The part of the process responsible for the emission and air pollution problem was a rapid boil of the kettle contents for a period of from 5 to 15 minutes during which time approximately 300 pounds per minute of steam at 220°F. were evolved from the kettle contents and vented directly to the air. This steam contained significant amounts of vinegar and spice oils and the area around the process building and plant not only had an offensive acrid odor, but under certain wind-free climatic conditions, the concentration of vinegar was high enough to make the air unbreathable. A test unit comprising a 42 inch diameter main vessel was initially installed on one of the kettle stacks, said vessel containing a gas inlet duct tapering to a 20 inch diameter outlet, a 26 inch diameter conical baffle (15° flate cone) spaced 10 inches from the end of the gas entry duct, and spray injection nozzles located so that four of the spray nozzles were located directly on the baffle, directed upward. Spray nozzles used were Bete Fog Nozzle Company Teflon nozzles, Type TF14FCN nozzles, described in U.S. Pat. No. 2,612,407, having a 90° full-cone spray angle and a 7/32 inch orifice diameter. Tests with this unit showed that with this nozzle size, injection spray rates of 8.1 gallons of water at 60°F. per minute per nozzle at a nozzle pressure of 40 pounds per square inch gage gave the high liquid holdup vortex zone by visual inspection, and an accompanying efficiency of 100% removal of the acetic acid and spice odors. Below this set of operating conditions, at 30 psig at the spray nozzles, corresponding to an input rate of 7.1 gallons of water per minute per nozzle, the acid odor reappeared, and the high intensity liquid holdup zone appeared to visually empty its liquid content to a low holdup level. Additionally, when the higher nozzle pressure of 40 psig was used with the TF14FCN nozzles, the liquid drainage from the scrubber was found to be at its boiling point, 212°F., indicating extremely high thermal contact efficiency. Further, the fact that the scrubber was able to quantitatively remove acetic acid from 220°F. steam with an effluent liquor temperatue of 212°F. indicated a highly unusual and unique mass transfer capability of the contactor.

Replacement of the TF14FCN nozzles with size TF20FCN nozzles, having a 5/16 inch orifice, conferred different characteristics on the scrubber. With the large spray nozzles, which require a higher nozzle pressure to achieve the same degree of spray atomization than do the smaller nozzles, operation of the scrubber to nozzle pressures of 50 psig failed to produce the high liquid holdup observed in the vortex zones for the smaller nozzles, and the odor and acid content of the effluent steam from the scrubber could not be removed. When the smaller nozzles, TF14FCN were substituted, high holdup zones were again visually observed, and analyses of the drainage liquor showed that the scrubber had returned to 100% efficiency, as was also evident by the acid odor free steam emission.

Measurement of pressure drop across the scrubber showed a gas pressure loss of less than 2.0 inch of water under full flow conditions, and removal of the demister pad and secondary measurement showed pressure losses of less than 1.0 inch of water across the baffle/spray section alone.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:
1. A method for treating a gas with apparatus including a treating vessel, a liquid spray nozzle, and means for supplying a liquid to said nozzle, the said method comprising,
    introducing a stream of untreated gas into said vessel,
    forming at least one toroidal vortex of said untreated gas in said vessel, the axis of said vortex being generally transverse to the flow of said untreated gas,
    introducing said liquid in droplet form into said vortex by means of said nozzle, the liquid injection rate of the liquid droplets and the liquid pressure of said nozzle respectively being sufficient to cause a trapped-spray zone of extremely high liquid holdup in said vortex, and
    withdrawing said treated gas from said vessel.

2. A method for treating a gas as set forth in claim 1, wherein the liquid spray is injected into the toroid concurrent with or transverse to the flow of gas in said vortex so as not to disrupt the stability of said vortex.

3. A method for treating a gas as set forth in claim 1 which includes, accelerating the stream of untreated gas by throttling it to facilitate the formation of the toroidal vortex, said throttling being carried out by impinging said stream of untreated gas on a baffle member positioned in the vessel substantially perpendicular to said direction of flow of said stream thereby deflecting said stream through the annular gap between said baffle and the wall of said vessel.

4. A method for treating a gas as set forth in claim 3 wherein, the velocity of the gas in the annular gap is between about 250 feet per minute and about 2000 feet per minute,
    forming at least one primary toroidal vortex of said untreated gas in said vessel above said baffle member.

5. A method for treating a gas as set forth in claim 4 which includes,
    introducing the liquid as a preformed spray onto the upper portion of the toroidal vortex.

6. A method for treating a gas as set forth in claim 4 which includes,
    forming a secondary vortex of the untreated gas in the vessel below the baffle member.

7. A method for treating a gas as set forth in claim 1 which includes,
    introducing the stream of untreated gas upwardly into the vessel,
    impinging said stream of untreated gas on a baffle member and deflecting said stream of untreated gas laterally within said vessel through an annular gap between the baffle and the inner wall of said vessel,
    forming a primary vortex of at least a portion of said untreated gas at a location above said baffle member,
    introducing liquid as a preformed spray into said primary vortex without disrupting the stability of said primary vortex, and
    circulating a portion of said liquid with said untreated gas in said primary vortex and treating said untreated gas with said liquid in said primary vortex.

8. A method for treating a gas as set forth in claim 7 which includes,
    forming a secondary vortex of a second portion of the untreated gas at a location below the baffle member,
    introducing liquid as a preformed spray into said secondary vortex without disrupting the stability of said secondary vortex, and
    circulating a portion of said liquid with said second portion of untreated gas in said secondary vortex and treating said last-named untreated gas with said liquid in said secondary vortex.

9. The method of claim 1 wherein the toroid is formed by accelerating the gas through a restricted flow region formed between a baffle and the vessel wall and the liquid is injected into the vortex at a distance of at least one vortex diameter above the baffle.

10. A method of treating a fume containing gas to remove the contaminants with apparatus including a treating vessel for said gas, a liquid-spray nozzle and means for supplying liquid to said nozzle, the said method comprising passing a stream of contaminated gas into said vessel, forming at least one toroidal vortex of said contaminated gas in said vessel, the axis of said vortex being generally transverse to the flow of said contaminated gas, injecting a spray of said liquid in droplet form on said toroidal vortex by means of said nozzle, setting the spray rate and the nozzle pressure of said liquid at magnitudes sufficient to cause said vortex to assume a dense opaque appearance when said droplets are injected into said vortex, whereby said droplets decontaminate said gas, and withdrawing the decontaminated gas from said vessel.

* * * * *